(12) United States Patent
Bevilacqua et al.

(10) Patent No.: US 11,356,374 B2
(45) Date of Patent: Jun. 7, 2022

(54) METHODS AND SYSTEMS FOR EVALUATING COMMUNICATIONS

(71) Applicant: Comcast Cable Communications, LLC, Philadelphia, PA (US)

(72) Inventors: John Bevilacqua, Boulder, CO (US); Jason Combs, Mt. Laurel, NJ (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 0 days.

(21) Appl. No.: 16/446,365

(22) Filed: Jun. 19, 2019

(65) Prior Publication Data

US 2020/0403925 A1  Dec. 24, 2020

(51) Int. Cl.
| | |
|---|---|
| *H04L 9/40* | (2022.01) |
| *H04L 47/2408* | (2022.01) |
| *H04L 69/16* | (2022.01) |
| *H04L 67/55* | (2022.01) |
| *H04L 67/51* | (2022.01) |
| *H04L 65/80* | (2022.01) |

(52) U.S. Cl.
CPC .... *H04L 47/2408* (2013.01); *H04L 29/06925* (2013.01); *H04L 63/0227* (2013.01); *H04L 67/16* (2013.01); *H04L 67/26* (2013.01); *H04L 69/16* (2013.01); *H04L 29/06523* (2013.01); *H04L 63/1483* (2013.01)

(58) Field of Classification Search
CPC .......... H04L 47/2408; H04W 28/0268; H04W 52/26; H04W 52/265
See application file for complete search history.

(56) References Cited

U.S. PATENT DOCUMENTS

| | | | | |
|---|---|---|---|---|
| 2009/0028169 | A1* | 1/2009 | Bear | H04L 47/14 370/406 |
| 2010/0005171 | A1* | 1/2010 | Arolovitch | H04L 67/1004 709/225 |
| 2014/0198795 | A1* | 7/2014 | Sajassi | H04L 12/18 370/392 |
| 2015/0327023 | A1* | 11/2015 | Park | H04W 4/023 455/456.3 |

* cited by examiner

Primary Examiner — Salvador E Rivas
(74) Attorney, Agent, or Firm — Ballard Spahr LLP

(57) ABSTRACT

Network traffic, such as packets addressed to a user device and/or a location, may be filtered/segregated to ensure that the user device and/or the location receives services for which they are subscribed.

20 Claims, 9 Drawing Sheets

400

410 RECEIVE A PLURALITY OF PACKETS

420 DETERMINE A VALUE OF A CLASS OF SERVICE PARAMETER

430 SEND ONE OR MORE PACKETS OF THE PLURALITY OF PACKETS HAVING A VALUE OF THE CLASS OF SERVICE PARAMETER THAT INDICATES A CONTENT SOURCE

440 BLOCK ANOTHER ONE OR MORE PACKETS OF THE PLURALITY OF PACKETS HAVING A VALUE OF THE CLASS OF SERVICE PARAMETER THAT DOES NOT INDICATE THE CONTENT SOURCE

METHODS AND SYSTEMS FOR EVALUATING COMMUNICATIONS

BACKGROUND

Despite the proliferation of content (e.g., video) services delivered digitally, many users still rely on legacy devices (e.g., legacy set-top boxes) to receive content services. These users often only subscribe to content services, despite other available services. As content providers move toward digital distribution of content, content distribution networks are converting or repurposing systems and bandwidth used to provide content services to legacy devices to provide additional digital capacity. As these systems and bandwidth are converted, the legacy devices are replaced with digital-capable devices. Unlike the legacy systems, the digital systems may not be configured to provide only digital video services without also providing high-speed data services, and vice versa. Thus, the user would be required to subscribe to both digital video services and other services, despite the user desiring only the digital video services (similar to the legacy service previously offered).

SUMMARY

It is to be understood that both the following general description and the following detailed description are exemplary and explanatory only and are not restrictive. Methods and systems for providing one or more services are described.

The methods and systems described may be configured to selectively provide one or more digital services (e.g., Internet Protocol (IP) video services, High Speed Data (HSD), and/or Voice over IP (VoIP)) to a location without providing all of the one or more digital services to the location. Packets associated with one or more subscribed digital services may be separated from packets associated with non-subscribed digital services based on a class of service parameter that identifies a source of the packets. The source of the packets may be a computing device (e.g., content server, etc.) configured to provide packets related to a service subscribed to by a user. Packets destined for a user device may be sent from the source to a network device. The network device may determine values of the class of service parameter for packets received from the source and determine if the values match a defined value using a configuration file. If the values match the defined value, the packets are sent to the user device. If the values do not match the defined value, the packets are not sent to the user device (e.g., the packets may be blocked and/or discarded). The user may change the services subscribed to, in which case the configuration file may be updated to reflect modified/additional defined values.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
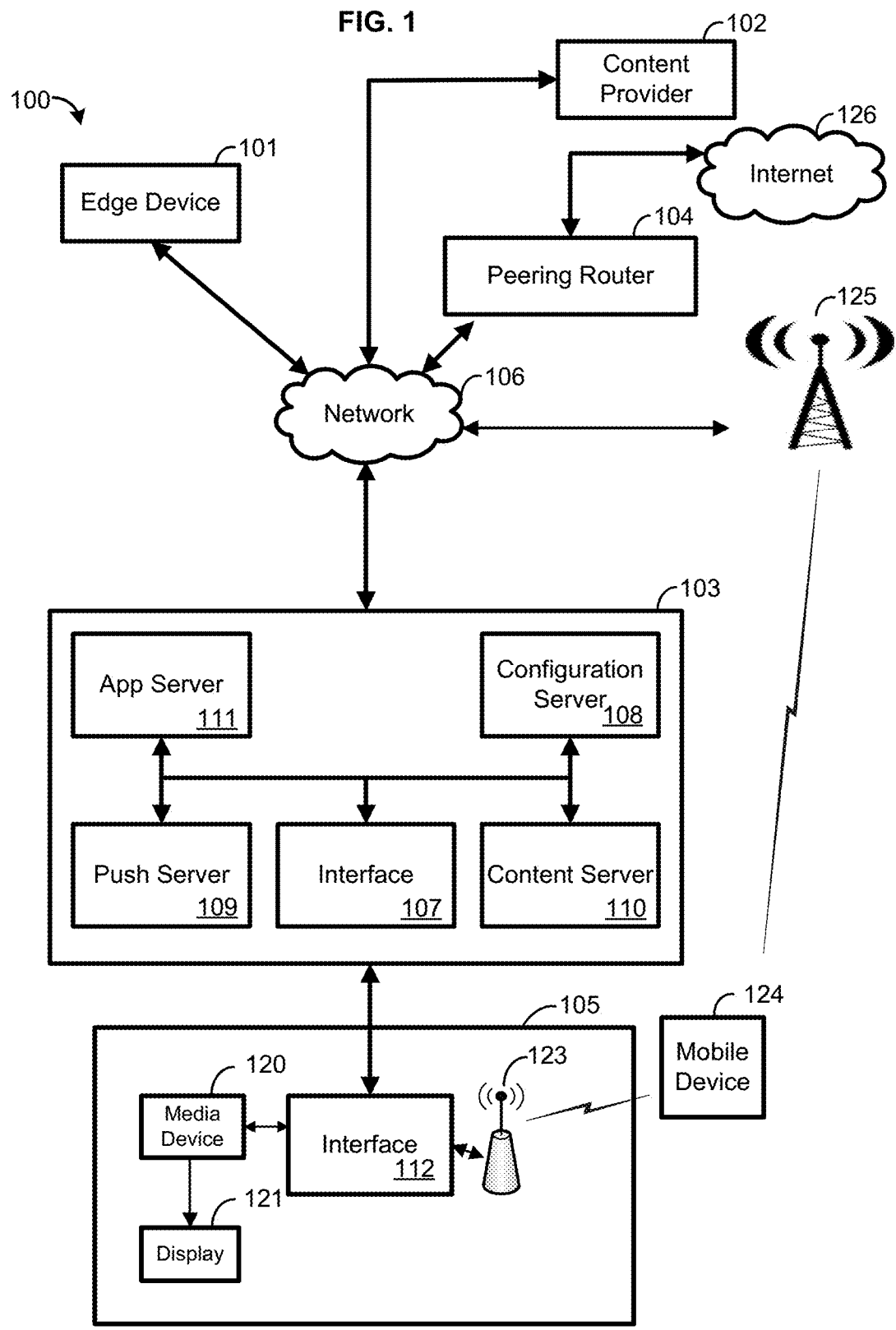
FIG. 1 shows a system for providing one or more services.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus (e.g., an Internet Protocol (IP) router, an edge device, a network device, etc.) to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to HLS, MPEG DASH, MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. Content may be and/or include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Video services (e.g., IP video, streaming video, etc.), voice/telephony services (e.g., voice-over-IP, etc.), and/or high-speed data (HSD) services (e.g., Internet services, etc.) may be provided via packets (e.g., IP data packets). As the packets traverse a network to a user device, the packets may be processed according to one or more parameters. One such parameter may be a class of service parameter, such as a Differentiated Services Code Point (DSCP). The class of service parameter is traditionally configured to control delivery precedence of specific packet traffic types. Methods and systems are described that configure the class of service parameter to be used to instead filter packets. The class of service parameter may be used to determine whether a packet should be sent, or blocked from being sent, to a user device, rather than to determine delivery precedence.

A configuration file may be generated to define (or inform of) one or more values of the class of service parameter that will be used to indicate an approved origin of a packet and to identify a network device (e.g., a Cable Modem Termination System (CMTS)) through which a user device (e.g., a modem, a set-top box, a content player, a mobile device, a smart device, a computing device, etc.) should request packets. The approved origin of a packet may be a computing device (e.g., a content source such as a video server) associated with a subscribed service. The computing device may be configured to update the class of service parameter in outgoing packets to include the defined one or more values.

The configuration file may be sent to the user device. The user device may send the defined one or more values of the class of service parameter to the network device and the network device may use the defined one or more values of the class of service parameter to determine whether to send, or block from sending, packets destined for the user device. In some instances, the user device may send instructions to the network device to use the defined one or more values of the class of service parameter to determine whether to send, or block from sending, packets destined for the user device. The instructions may instruct the network device to use a set of rules and or configurations already present on the network device, such as a filter element, to determine whether to send, or block from sending, packets destined for the user device. In this manner, the defined one or more values of the class of service parameter may indicate that a packet containing the defined one or more values of the class of service parameter originated from an approved origin, and thus the packet relates to a subscribed service (e.g., a video service), rather than an unsubscribed service (e.g., a telephony service, or HSD service). The network device may send the packet containing the defined one or more values of the class of service parameter and block all other packets destined for the user device, resulting in the user device receiving only data packets associated with a subscribed service.

The user may modify, add, or delete a subscribed service and the configuration file may be updated to modify, add, or delete defined values of the class of service parameter. The configuration may be sent to the user device to replace an existing configuration file. The user device may send the modified, added, or deleted defined values to the network device which may then use the defined values to filter packets.

FIG. 1 shows an example system 100 for providing one or more services. The system 100 may comprise a network 106 used for transmission of data between various components of the system 100. The network 106 may be any type of information distribution network. The network 106 may include an optical fiber network, a coaxial cable network, a hybrid fiber/coax distribution network, and/or the like. The network 106 may include and/or support any type of network technology and/or topology. The network 106 may include networks of Internet devices, telephone networks, cellular telephone networks, fiber optic networks, local wireless networks (e.g., WiMAX), satellite networks, and any other desired network. The network 106 may use a series of interconnected communication links (e.g., coaxial cables, satellite distribution, optical fibers, wireless, etc.) to connect an edge device 101, a content provider 102, a multiple-system operator (MSO) 103 (e.g., local office or headend), a premises 105 (e.g., business, home, etc.), a configuration server 108, and a peering router 104.

The content provider 102 may create (e.g., produce, distribute, etc.) content that is embodied in one or more multimedia asset data files (e.g., content assets). The content provider 102 may be one or more of a service provider, television broadcast company, a movie studio, a web site or service, an audio source, and/or the like. The content provider 102 may provide content to a user device and/or user, such as video, audio, games, applications, data, and the like. The content provider 102 may provide streaming media, such as on-demand content (e.g., video on-demand), content recordings, and/or the like. The content provider 102 may be managed by third party content providers, service providers, online content providers, over-the-top content providers, and/or the like. The content may be provided via a subscription, by individual item purchase or rental, and/or the like. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The content provider 102 may provide the content via a packet switched network path, such as via an internet protocol (IP) based connection. Content may include a plurality of packets. The content provider 102 may provide tag, mark and/or associate content, such as each packet of a plurality of packets associated with content, with a class of service parameter value (and/or quality of service parameter value). A portion of each packet of the plurality of packets may be associated with and/or include (e.g., in a header) a class of service parameter (and/or quality of service parameter) of a plurality of class of service parameters. A class of service parameter (and/or quality of service parameter) may be a Differentiated Services Code Point (DSCP) value. A class of service parameter (and/or quality of service parameter) may be a DSCP Value for downstream or upstream traffic. A class of service parameter (and/or quality of service parameter) may include and/or be associated with Internet Fully Qualified Domain Names (FQDNs), wildcarded varients of FQDNs (such as via the use of pattern matching regular expression (regex) syntax, and/or the like. A class of service parameter may include and/or be associated one or more network addresses (e.g., a range of IP addresses, an IPv4 source address range, an IPv6 source address range, an IPv4 destination address range, an IPv6 destination address range, etc.), a range of transmission control protocol (TCP) and/or user datagram protocol (UDP) destination/source ports, and/or the like.

The content provider 102 may provide the content to the MSO 103 and the content may be ultimately provided to the premises 105. As described, each packet destined for the premises 105 may include a class of service parameter. The value of a class of service parameter may identify an origin of a packet (data packet), such as one or more devices (e.g., the content provider 102, servers, network components, etc.), one or more service providers, and/or a location from which a packet of a plurality of packets (e.g., content, content items, etc.) was requested, was sent, was derived, is associated with, and/or the like. The peering router 104 may receive content from the content provider 102 and/or the Internet 126 The content provider 102 and/or the Internet 126 may provide the content to the peering router 104 via a packet switched network path, such as via an internet protocol (IP) based connection. The value of the class of service parameter included with each packet of a plurality of packets received from and/or sent by the content provider 102 and/or the Internet 126 may be stripped and/or overridden by the peering router 104. Rather than using a class of service parameter in a traditional manner, such as for controlling/managing delivery precedence of specific packet traffic types, a class of service parameter may be used to identify a source (for downstream traffic) or destination (for upstream traffic) of a packet utilizing Internet protocol version 4 (IPv4), Internet Protocol version 6 (IPv6), or any other protocol. A class of service parameter may be used to determine/identify a customer premise equipment (CPE) source (for upstream traffic) or destination (for downstream traffic) utilizing IPv4, IPv6, or any other protocol. A class of service parameter may be used to determine/identify a port, utilizing Transmission Control Protocol (TCP), User Datagram Protocol (UDP), or any other protocol and associated with a packet (e.g., a source of the packet, a destination of the packet, etc.). A class of service parameter may be used to determine whether a packet should be sent, or blocked from being sent, to the premises 105. A class of service parameter may be indicated and/or defined within a data packet, such as a class of service parameter indicated by one or more network addresses (IP addresses) according to IPv4 or IPv6.

The peering router 104 may maintain a record (e.g., database, storage, memory, etc.) of content sources (e.g., the content provider 102, the content server, 110, the Internet 126, etc.) in communication with the peering router 104. The record may associate a source address of each content source with a value that corresponds to a class of service parameter value. To identify a packet as originating from a content source and/or the Internet 126, the peering router 104 may examine the source address identified in the header of the packet and compare the source address with the record (e.g., database, storage, memory, etc.). The peering router 104 may tag, mark, and/or override the class of service parameter value included with a packet with a value that indicates the content sources (e.g., the content provider 102, the content server, 110, etc.) from which the packet was received. The peering router 104 may provide packets with class of service parameters that have been tagged, marked, and/or overridden to the MSO 103 to be routed to and/or provided to the premises 105.

The MSO 103 may be an operator of multiple cable or direct-broadcast satellite television systems. The MSO 103 may be a multichannel video programming distributor (MVPD). The MVPD may be a service provider that delivers video programming services. The MSO 103 may be, for example, a direct-broadcast satellite (DBS) provider, a cable television (CATV) system, and/or a competitive local exchange carrier (CLEC). The MSO 103 may be part of and/or communicate with the network 106. The MSO 103 may transmit downstream communications (e.g., packets, information signals, etc.) to the premises 105 via the network 106 or another network.

The MSO 103 may include a variety of servers 108-111 that may be configured to perform various functions. The MSO 103 may include the configuration server 108. The configuration server 108 may be one or more computing devices that communicate with the MSO 103 (e.g., an interface 107, etc.) for providing data and/or services. For example, the configuration server 108 may be a provisioning server. The configuration server 108 may provide and/or provision services such as network (e.g., Internet, high-speed data, etc.) connectivity, video service (e.g., IP video), telephony services (e.g., VOIP), device registration services, device provisioning services, device authentication services, device policy services, media management (e.g., media server), content services, streaming services, broadband services, or other network-related services. The configuration server 108 may provide devices (e.g., the MSO 103, the interface 107, the interface 112, etc.) with one or more resources such as data, devices, and files.

The MSO 103 may include the push notification server 109. The push notification server 109 may be one or more computing devices that deliver data and/or commands to the premises 105 via the interface 114. The push notification server 109 may generate push notifications related to functions such as billing, reporting, and user/subscriber management to deliver data and/or commands to various premises 105 connected to the network 106 (e.g., such as notifications to devices in the premises 105 that are configured to detect such notifications).

The content server 110 may be one or more computing devices that are configured to provide content to the premises 105. The content server 110 may provide streaming media, such as on-demand content (e.g., video on-demand), content recordings, and/or the like. The content server 110 may include software to validate user identities and entitlements, to locate and retrieve requested content, to encrypt the content, and to initiate delivery (e.g., streaming or downloading) of the content to the requesting user(s) and/or device(s). The content server 110 may also be configured to generate advertising decisions and rules, and transmit them to a requesting user or device.

The content server 110 may be managed by third party content providers, service providers, online content providers, over-the-top content providers, and/or the like. Content, such as a plurality of packets, may be provided via a subscription, by individual item purchase or rental, and/or the like. The content server 110 may provide the content (e.g., packets, network traffic, etc.) via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like. The content server 110 may provide tag, mark and/or associate content, such as each packet of a plurality of packets associated with content, with a class of service parameter value (and/or quality of service parameter value). The class of service parameter value may be used to indicate that the content originated from a content source (e.g., the content provider 102, the content server, 110, etc.).

The application server 111 may be one or more computing devices configured to offer any desired service. For example, the application server 111 may be responsible for collecting television program listings information and generating a data download for electronic program guide listings. As another example, the application server 111 may be responsible for monitoring user viewing habits and collecting that information for use in selecting advertisements. As another example, the application server 111 may be responsible for formatting and inserting advertisements in, for example a video stream being transmitted to the premises 105. Although shown separately, one of ordinary skill in the art will appreciate that the push server 109, the content server 110, and the application server 111 may be combined.

The MSO 103 may include the interface 107. The interface 107 may be and/or include a termination system (TS). More specifically, the interface 107 may be and/or include one or more of a cable modem termination system (CMTS), an optical line terminal (OLT), and/or any other a computing device configured to manage communications between devices such as a push notification server 109, a content server 110, and an application server 111. The interface 107 may be associated with and/or operate according to a standard, such as the Data Over Cable Service Interface Specification (DOCSIS) standard, a Ethernet Passive optical Network (EPON) standard, and/or any other standard.

The interface 107 may receive upstream communications (e.g., packets, information signals, etc.) from devices (e.g., modems/cable modems, modulators, optical network units, etc.) at the premises 105. The MSO 103 and/or any other device/component in communication with the network 106 may transmit downstream communications (e.g., packets, information signals, etc.) to the premises 105 via the interface 107. The premises 105 may include an interface 112 used to receive and process the downstream communications (e.g., packets, information signals, etc.). The MSO 103 and/or any other device/component in communication with the network 106, via the interface 107, may provide and/or place data on one or more downstream frequencies that are received by devices (e.g., modems, modulators, etc.) at the premises 105 via the interface 112.

The premises 105 may be a home, business, dwelling, and/or the like. The premises 105 may include an interface 112. The interface 112 may include any communication circuitry needed to allow a device to communicate on one or more links with other devices at the MSO 103, such as the interface 107. The interface 112 may communicate with the MSO 103 and/or the network 106 via a variety of protocols, such as internet protocol, transmission control protocol, file transfer protocol, session initiation protocol, voice over internet protocol (VOIP), and/or the like. The interface 112 may include any communication circuitry needed to allow a user device to communicate with the network 106 via one or more links and/or with the MSO 103 (e.g., other devices at the MSO 103, etc.). The interface 112 may communicate with the MSO 103 and/or the network 106 via a variety of protocols, such as internet protocol, transmission control protocol, file transfer protocol, session initiation protocol, voice over internet protocol (VOW), and/or the like. The interface 112 may communicate with the MSO 103 and/or the network 106 via a variety of communication protocols and standards, such as Data Over Cable Service Interface Specification (DOCSIS).

A single modem/network interface or a plurality of modems/network interfaces operating in parallel may be implemented within the interface 112. The interface 112 may include and/or be in communication with a media device 120. The media device 120 may demodulate and/or decode, if needed, signals for display on a display device 121, such as on a television set (TV) or a computer monitor. The media device 120 may be a demodulator, decoder, frequency tuner, and/or the like. The media device 120 and/or interface 112 may include (not shown) local network interfaces to provide communication signals to requesting entities/devices in and/or associated with the premises 105. Local network interfaces may include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

The media device 120 may be directly connected to the network (e.g., for communications via in-band and/or out-of-band signals of a content delivery network) and/or connected to MSO 103 and/or the network 106 via the interface 112. The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signals associated with the media device 120 may be demodulated and/or decoded in a variety of equipment, including the interface 112, a computer, a TV, a monitor, or a satellite dish.

A first access point 123 (e.g., a wireless access point) may be located at the premises 105. The first access point 123 may provide one or more wireless networks in at least a portion of the premises 105. The first access point 123 may provide access to the network 106 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. Some or all of the first access point 123, the interface 112, the media device 120, and the display device 121 may be implemented as a single device.

The premises 105 is not necessarily fixed. A user may receive content, such as a plurality of packets, from the network 106, via the MSO 103 (or associated devices/components), on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the premises 105 or remote from the premises 105. The second access point 125 may be located along a travel route, within a business or residence, or other useful locations (e.g., travel stop, city center, park).

A user device (e.g., the media device 120, the interface 112, the display device 121, the mobile device 124, a set-top box, a content player, a mobile device, a smart device, a computing device, etc.) located at and/or associated with the premises 105 may be associated with a service, such as a subscription service that enables certain types of data, content, services, and/or the like to be provided to and/or associated with the user device via the network 106, while other types of data, content, services, and/or the like may be prevented/blocked from be provided to the premises 105. The user device may subscribed to a service that permits movies, television, and/or other content managed, sourced, and/or generated by a service provider to be provided to the user device, and blocks/prevents Internet and/or other high-speed data service from being provided to the user device. The MSO 103 may permit certain services (e.g., movies, television, and/or other content managed, sourced, and/or generated by a service provider) to be provided to the user device, and block/prevent other services (e.g., Internet, high-speed data, etc.) from being provided to the user device. Content associated with various services may be and/or be represented by a plurality of packets (e.g., data packets, Internet Protocol packets, etc.) received from a source, such as the content provider 102, the content server 110, and/or the like.

To ensure that a user device (e.g., the premises 105, etc.) receives content (e.g., packets, network traffic, etc.) associated with services for which they are subscribed, the interface 107 may filter and/or segregate a plurality of packets traversing the network 106. A portion of each packet of the plurality of packets may be associated with and/or include (e.g., in a header) a class of service parameter (and/or quality of service parameter) of a plurality of class of service parameters. A value of a class of service parameter may identify a source (origin) of a packet, such as one or more devices (e.g., servers, network components, the content provider 102, the content server 110, etc.), service providers, and/or a location from which a packet of a plurality of packets was requested, was sent, was derived, is associated with, and/or the like. As described, a class of service parameter (and/or quality of service parameter) may be a Differentiated Services Code Point (DSCP) value. A class of service parameter (and/or quality of service parameter) may be a DSCP Value for downstream or upstream traffic. A class of service parameter (and/or quality of service parameter) may include and/or be associated with Internet Fully Qualified Domain Names (FQDNs), wildcarded varients of FQDNs (such as via the use of pattern matching regular expression (regex) syntax, and/or the like. The interface 107 may filter and/or segregate the packets based on one or more factors/rules, such as based on an origin of the packet, a destination of the packet, service provider associated with the packet, subscription service parameters, class of service rules, quality of service rules, access control rules and/or the like. The interface 107 may be configured to impose, execute, process and/or adhere to the one or more factors/ rules based on information received from the configuration server 108.

The configuration server 108 may be associated with a service provider. The service provider may use the configuration server 108 to modify device settings, choose optimal configuration for devices, and to provide one or more services to a user device, such as video services (e.g., IP video, streaming video, etc.), voice/telephony services (e.g., voice-over-IP, etc.), high-speed data (HSD) services (e.g., Internet services, etc.), or any other service. The configuration server 108 may provide/send information (e.g., configuration files, etc.) to the interface 112, the interface 108, and/or any other device (e.g., the media device 120, the display device 121, the mobile device 124, etc.) and/or the like during a setup/bootup process and/or on a periodic basis that configures, enables, and/or facilitates such devices to manage and/or be associated with one or more services, such as video services (e.g., IP video, streaming video, etc.), voice/telephony services (e.g., voice-over-IP, etc.), high-speed data (HSD) services (e.g., Internet services, etc.), or any other service.

The configuration server 108 may provide/send a configuration file (e.g., an executable program, a boot file, etc.) to the interface 112. The configuration file may define specific service flows and traffic classifiers (e.g., class of service parameters, etc.) needed to provide a service, such as such as video services (e.g., IP video, streaming video, etc.), voice/telephony services (e.g., voice-over-IP, etc.), high-speed data (HSD) services (e.g., Internet services, etc.). Further, the configuration file may point and/or direct the interface 112 to the interface 107 to receive a service, such as a service that permits packets of a particular type to be delivered to the interface 107 and denies packets of a different type from being delivered to the interface 112. The configuration file may point and/or direct the interface 112 to the interface 107 because the interface 107 may be configured to filter and/or segregate packets associated with (e.g., destined for, upstream/downstream packets, etc.) the interface 112. Further, the configuration file may associate (e.g., configure) the interface 112 with a subscribed service (e.g., a video service, IP video service, streaming video service, etc.), rather than an unsubscribed service (e.g., a telephony service such as VOIP, or high-speed data (HSD) service, etc.). The configuration file may associate the interface 112 with the subscribed service based on an authorized value of a class of service parameter included with (e.g., within a header, etc.) packets associated with the subscribed service. Packets associated with the subscribed service may include the authorized value because the packets relate to and/or associated with the subscribed service.

The interface 112 may send/provide the authorized value of a class of service parameter to the interface 107 prior to and/or during a request for packets associated with the subscribed service. Authorized values for the subscribed service may be modified, added, or deleted and/or the like based on a configuration file (e.g., provided by the configuration server 108 and/or any device/component associated with a service provider). Configuration files may be replaced, updated, shared, modified, and/or the like to enable packets of any type and/or origin to be delivered to the interface 112, such as during a change in a subscribed service. The interface 107 may use the authorized values (e.g., determined by a configuration file, etc.) and/or other defined values to filter and/or segregate packets.

The configuration server 108 provide/send a filter element to the interface 107. The interface 107 may use the filter element to filter and/or segregate the packets. A filter element may include information/data associated with the one or more factors/rules (e.g., class of service rules, quality of service rules, access control rules, etc.) for managing packets. The interface 107 may receive a filter element from the configuration server 108. The filter element may be a configuration file, an application, code, encrypted data, and/or the like. The interface 107 may receive a filter element from the configuration server 108 based on a network and/or customer (e.g., user device) service provisioning, maintenance, and/or allocation process/procedure. The interface 107, based on the filter element, may determine values of the class of service parameter of packets received from a content source (e.g., the content provider 102, the content server, 110, etc.) and/or determine if the values match a defined value, such as the authorized value received from the interface 112. As described, The interface 112 may send/provide the authorized value of a class of service parameter to the interface 107 prior to and/or during a request for data, content, services, and/or the like that may be sent/provided to the interface 112 via the interface 107. In some instances, the authorized values may be defined by the filter element. The interface 107 may be configured with the filter element and the interface 112 may send/provide instructions to the interface 107 (such as when registering for a service supported by the interface 107) to use the filter element according to defined/authorized values of the class of service parameter to determine whether to send, or block from sending, packets.

The interface 107 may use the filter element to determine that values of a class of service parameter associated with and/or included in a packet destined for and/or associated with the interface 112 matches the authorized value. When values of a class of service parameter associated with and/or included in packets match the authorized value, the interface 107 may send/forward the packets to the interface 112. When values of a class of service parameter associated with and/or included in packets do not match the authorized value, the interface 107 may prevent (e.g., block, discard, etc.) the packets from being sent/forwarded to the interface 112.

Figure 2:
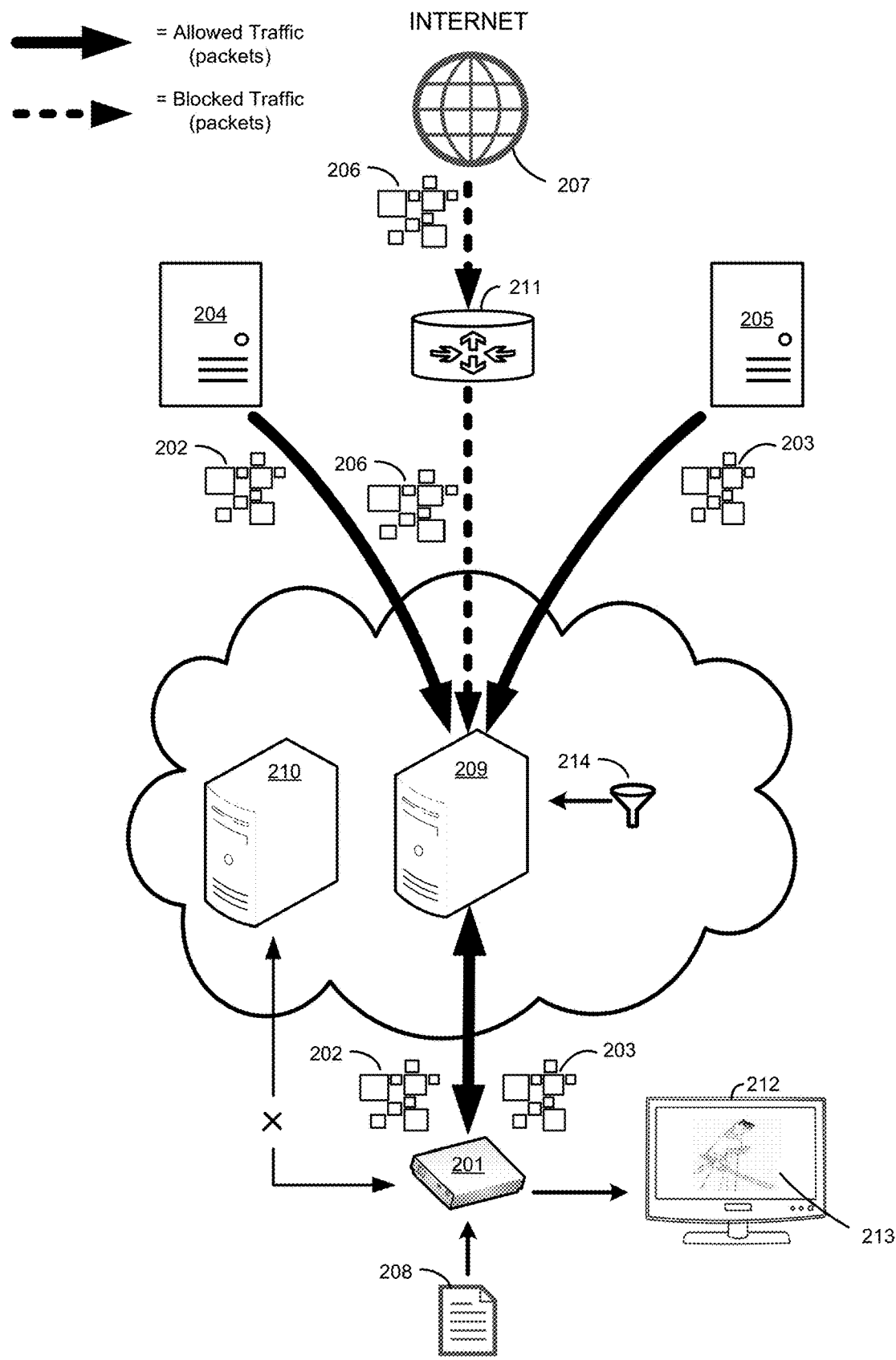
FIG. 2 shows a system for providing one or more services.

FIG. 2 shows an example system 200 for providing one or more services. Video services (e.g., IP video, streaming video, etc.), voice/telephony services (e.g., voice-over-IP, etc.), high-speed data (HSD) services (e.g., Internet services, etc.), or any other service may be provided via packets (e.g., IP data packets). For instance, when a user of a user device 201 (e.g., the interface 112, the media device 120, a set-top box, a content player, a mobile device, a smart device, a computing device, etc.) desires to view a movie, television, or other content managed, sourced, and/or generated by the user's service provider (e.g., Title VI content, non-Internet content, etc.), the content may be provided via the network device 209. In contrast, when the user attempts to use the user device 201 to browse the Internet and/or otherwise send and/or receive data to/from the Internet 207, the network device 209 may block such an attempt.

As the packets traverse a network (e.g., the network 106, etc.) to a user device 201 (e.g., the interface 112, the media device 120, a set-top box, a content player, a mobile device, a smart device, a computing device, etc.), the packets may be processed according to one or more parameters, such as a class of service parameter. A class of service parameter may be a Differentiated Services Code Point (DSCP). A class of service parameter may be and/or be associated with one or more network addresses (e.g., a range of IP addresses, an IPv4 source address range, an IPv6 source address range, an IPv4 destination address range, an IPv6 destination address range, etc.), a range of transmission control protocol (TCP) and/or user datagram protocol (UDP) destination/source ports, and/or the like. A class of service parameter may be any value, parameter, or configuration. The class of service parameter is traditionally configured to control delivery precedence of specific packet traffic types. However, the system 200 (and other methods/systems described herein) utilizes a class of service parameter in a non-traditional way. Specifically, a class of service parameter is used to filter packets. The class of service parameter may be used to determine whether a packet should be sent, or blocked from being sent, to a user device 201, rather than to define queueing policies in devices (e.g., routers, etc.) in a path between a server and a customer premise equipment, or as part of a firewall/datacenter device (e.g., router, etc.) access control list (ACL) employed in secured network.

The value of a class of service parameter included with and/or associated with a packet may identify and/or be associated with a source (e.g., origin, etc.) of the packets. The value of a class of service parameter may be associated with a packet type. The value of a class of service parameter may identify and/or be used to determine that packets 202 and packets 203 originate from source 204 and source 205 (e.g., the content provider 102, the content server 110, etc.), respectively. The packets 202 and packets 203 may be associated with a particular data type and/or service, such as video/video service (e.g., IP video, streaming video, video assets, etc.). The value of a class of service parameter may identify and/or be used to determine that packets 206 originate from the Internet 207. The packets 206 may be associated with Internet-based content (e.g., high-speed data service, etc.). The class of service parameters may be determined by and/or set by a service provider, a device, and/or the like. The source 204 and the source 205 may insert the value into the class of service parameter for the packets 202 and the packets 203, respectively.

The user device 201 may receive and/or be configured with a configuration file 208 (e.g., an executable program, a boot file, etc.). The user device 201 may receive and/or be configured with the configuration file 208 via a configuration device (not shown) (e.g., the configuration server 108, etc.) and/or any other device/component associated with a service provider, such as based on a subscription service provided by the service provider. The user device 201 may use the configuration file 208 to ensure that the user device 201 receives a subscribed/selected service. The configuration file 208 may be generated and/or used to define (or inform of) one or more values of the class of service parameter that may be used to indicate/identify an approved origin of a packet. The user device may be configured by a configuration device (not shown) (e.g., the configuration server 108, etc.) to communicate with a specific network device, such as a network device 210 (e.g., cable modem termination system (CMTS), optical line terminal (OLT), etc.) through which a user device 201 should request packets (e.g., the packets 202, the packets 203, etc.). The approved origin of a packet may be the source 204 or the source 205 (e.g., a content servers, a video servers, a content source, etc.) associated with the selected/subscribed service. The source 204 and the source 205 may be configured to update the class of service parameter in outgoing packets 202 and packets 203, respectively, to include the defined one or more values.

The system 200 may include a network device 209 (e.g., the interface 107, etc.) and a network device 210 (e.g., the interface 107, etc.). The configuration file 208 may point, direct, and/or otherwise cause the user device 201 to communicate with the network device 209. The configuration file 208 may cause the user device 201 to not communicate with the network device 210 (indicated by a the broken communication line), because the network device 210 may not be configured to filter and/or segregate packets destined for the user device 201, such as the packets 202 and the packets 203. The configuration file 208 may indicate that the network device 209 is configured to filter and/or segregate packets destined for the user device 201 according to an authorized value of a class of service parameter included with (e.g., within a header, etc.) the packet 202 and the packets 203. The packets 202 and the packets 203 may include the authorized value because the packets 202 and the packets 203 relate to and/or associated with a subscribed service (e.g., a video service, IP video service, streaming video service, etc.), rather than an unsubscribed service (e.g., a telephony service such as VOIP, or high-speed data (HSD) service, etc.).

The user device 201 may send/provide the authorized value of a class of service parameter to the network device 209 prior to and/or during a request for data, content, services, and/or the like (e.g., the packets 202, the packets 203, etc.) that may be sent/provided to the user device 201. In some instances, the authorized value of a class of service parameter, may be defined by a filter element 214. The network device 209 may be configured with the filter element 214 and the user device 201 may send instructions to the network device 209 to use the filter element 214. The authorized value of a class of service parameter may indicate and/or be associated with data, content, services (e.g., the subscribed service), and/or the like that originate from an authorized device and/or location, such as the source 204 and the source 205. The service provider, a user and/or the user device 201 may modify, add, or delete the subscribed service and the configuration file 208 may be updated and or replaced to modify, add, or delete defined values (e.g., authorized values, etc.) of the class of service parameter. A configuration file may be sent to the user device 201 to replace the configuration file 208. The user device 201 may send the modified, added, or deleted defined values to the network device 209. The user device 201, based on a configuration file, may send instructions to the network device 209 to use a filter element (the filter element 214) that informs, instructs, includes and/or the like the modified, added, or deleted defined values. The network device 209 may use the defined values to filter packets.

The network device 209 may receive a plurality of packets associated with data, content, services (e.g., the subscribed service), and/or the like. The plurality of packets (e.g., data packets) may include the packets 202, the packets 203, received from the source 204 and the source 205, respectively. The network device 209 may receive packets 206 from an Internet Peering Router 211 (e.g., peering router 104, etc.) that originate from the Internet 207. The Internet Peering Router 211 may write and/or overwrite class of service parameter values on each packet of the packets 206 (e.g., packets that originate from the Internet 207, etc.) to any value, such as a value used to identify and/or classify packets as being associated with (e.g., originated from, destined for, etc.) the Internet 207.

The configuration device (not shown) (e.g., the configuration server 108, etc.) and/or any other device/component associated with the service provider may provide, send, and/or use to configure the network device 209 with the filter element 214. The filter element 214 may be a configuration file, code, encrypted data, and/or the like. The network device 209 may use the filter element 214 to filter the packets 202, the packets 203, and the packets 206 to different subsets, groups, classes, and/or the like, based on a rule (e.g., a service provider rule, etc.). The rule may dictate that packets (e.g., the packets 202 and the packets 203) that originate from a specific device and/or location (e.g., the source 204 and the source 205, etc.) and/or are associated with a specific class of service (e.g., a video service, IP video service, streaming video service, etc.) may be sent to the user device 201. The rule may dictate that packets (e.g., the packets 206, etc.) that do not originate from the specific device and/or location and/or are not associated with the specific class of service (e.g., a video service, IP video service, streaming video service, etc.), such as the packets 206, may be blocked from being sent to the user device 201.

Data, content, services, and/or the like (e.g., packets, network traffic, etc.) may be sent and/or forwarded to the user device 201 by the network device 209 according to the authorized value of a class of service parameter. The network device 209 may block packets from being sent to the user device 201 that does not include and/or is associated with the authorized value of a class of service parameter. The network device 209 may cause the packets 202 and the packets 203 to be sent to the user device 201 based on a request from the user device 201. The user device 201 may cause display of the packets 202 and/or the packets 203 via a display device 212. The display device 212 may display the packets 202 and/or the packets 203 as a video 213.

Figure 3:
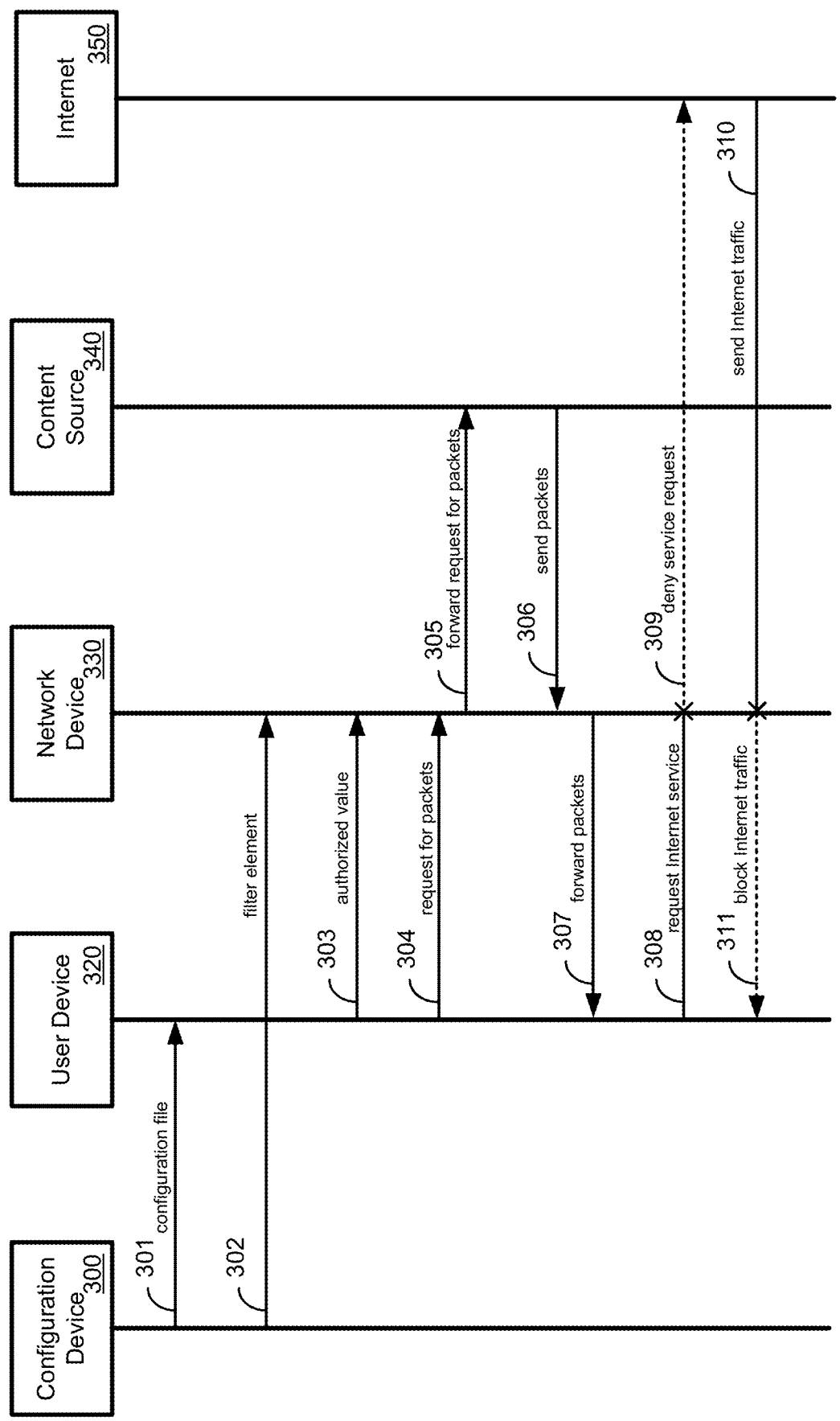
FIG. 3 shows a communication flow diagram for providing one or more services.

FIG. 3 shows an example communication flow diagram for providing one or more services. A configuration device 300 (e.g., the configuration server 108, etc.) may send/provide, at 301, a configuration file to a user device 320 (e.g., a modem, a set-top box, a content player, a mobile device, a smart device, a computing device, the interface 112, the user device 201, etc.). The configuration file may define one or more values of a class of service parameter that may be used to indicate/identify an approved origin of a packet. The configuration file may also direct/point the user device 310 to a network device 320 (e.g., a cable modem termination system (CMTS), an optical line terminal (OLT), the interface 107, the network device 209, etc.) to receive packets associated with a service, such as a video service (e.g., IP video service, streaming video service, etc.) or any other service. The network device 320 may be configured with data/information (e.g., a filter element, etc.) that informs that network device 320 of the one or more values of a class of service parameter that may be used to indicate/identify an approved origin of a packet. The configuration file may direct/point the user device 310 to a network device 320 and the user device 310 may instruct/inform the network device 320 to use the one or more values of a class of service parameter according to the data/information (e.g., a filter element, etc.).

At 302, the configuration device 300 may send/provide a filter element to the network device 320. It should be noted that steps 301 and 302 may occur simultaneously or in any order, such as step 302 being performed prior to step 301. The filter element may include information/data associated with one or more factors/rules (e.g., class of service rules, quality of service rules, access control rules, etc.) for managing packets. The filter element may be a configuration file, an application, code, encrypted data, and/or the like.

At 303, the user device 320 may send/provide the authorized values of a class of service parameter to the network device 320. In some instances, the user device 320 may send instructions to the network device 320 to use the one or more values of a class of service parameter already stored on the network device 320 according to the data/information (e.g., a filter element, etc.) used to configure the network device 320. At 304, the user device 320 may request packets associated with the service. For instance, a user of the user device 320 may desire to view a movie, television, or other content managed, sourced, and/or generated by the user's service provider (e.g., Title VI content, non-Internet content, etc.) based on the service. The network device 320 may use a filter element (the filter element received from the user device 320, a filter element received from the configuration device 300 and instructed to use by the user device, etc.) to analyze packets associated with the request from the user device 320 to determine if class of service parameters included with packets associated with the request match the authorized values. If the class of service parameters included with packets associated with the request do not match the authorized value, then the network device 330 may block the request. If the class of service parameters included with packets associated with the request match the authorized value, then at 305, the network device 330 may forward the request to the a content source 340 (e.g., the content provider 102, the content server, 110, the source 204, the source 205, etc.).

The content source 340 may be a device configured to generate/provide packets associated with the service, such as IP video packets, streaming video packets, and/or the like. At 306, the content source 340 may send packets associated with the service to the user device 320. The network device may analyze the packets from the content source 340 to ensure that the packets include a class of service parameter that matches the authorized values. If the class of service parameters included with packets from the content source 340 do not match the authorized value, then the network device 330 may block the packets. At 307, if the class of service parameters included with packets from the content source 340 match the authorized value, then the network device 330 may forward the packets to the user device 320. The user device 320 may cause display of the packets from the content source 340. For instance the user device 320, based on the packets from the content source 340, may cause display of a movie, a television program, or other content managed, sourced, and/or generated by the service provider.

At 308, the user device 320 may request packets associated with a service that the user device 320 is not subscribed to, such as Internet service. For instance, a user of the user device 320 may attempt to use the user device 320 to browse the Internet 350 and/or otherwise send and/or receive data to/from the Internet 350. The network device 330 may use the filter element associated with the user device 320 to analyze packets associated with the request from the user device 320 for the Internet service to determine if class of service parameters included with packets associated with the request match the authorized values. At 309, the network device 330 may determine that class of service parameters included with packets do not match the authorized value and block the request (e.g., block the packets associated with the request for Internet service, etc.).

At 310, the Internet 350 may attempt to send traffic (packets) associated with Internet service to the user device 320. The network device 320 may use the filter element and authorized values associated with the user device 320 to analyze the traffic (packets) from the Internet 350 to determine if class of service parameters included with packets match the authorized values. At 311, the network device 330 may determine that class of service parameters included with the traffic (packets) from the Internet 350 do not match the authorized value and block the traffic (packets).

Figure 4:
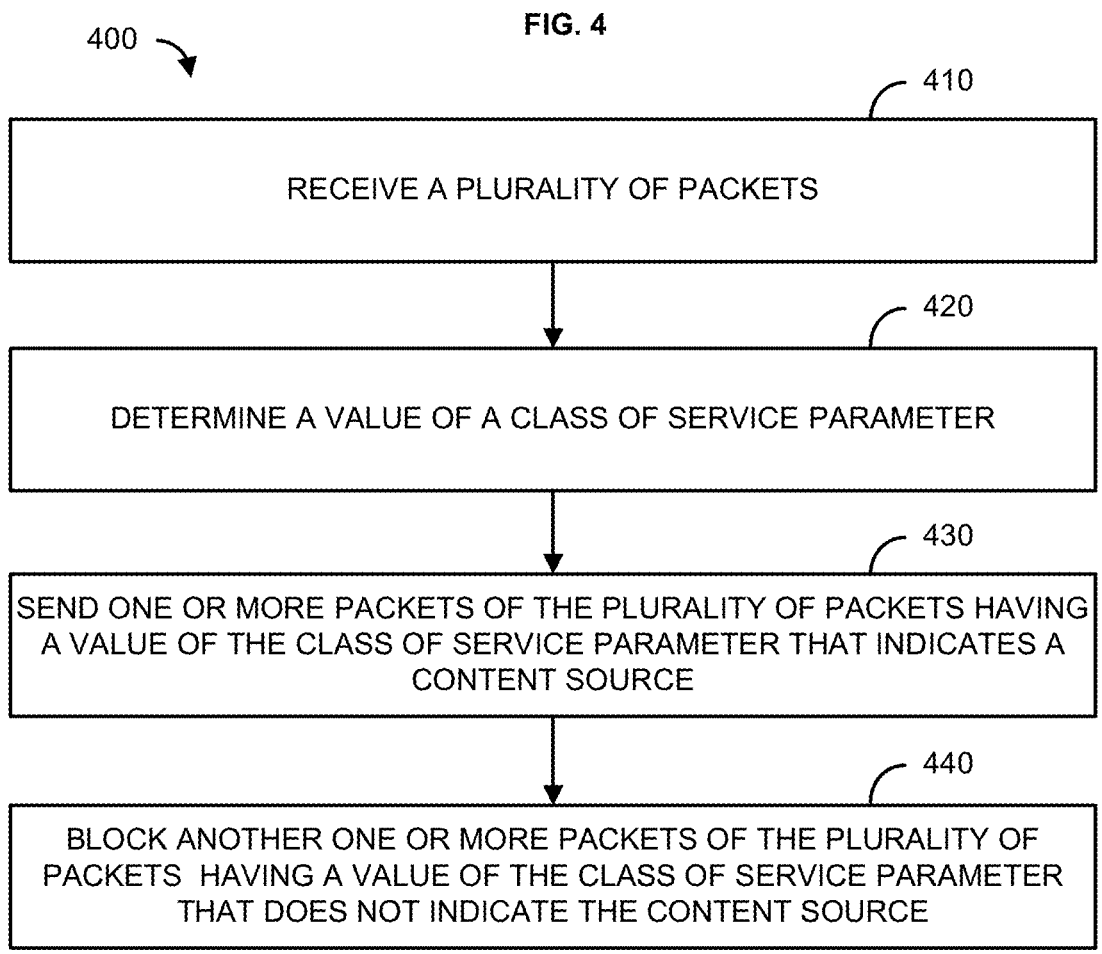
FIG. 4 shows a flowchart of a method for providing one or more services.

FIG. 4 shows a flowchart of an example method 400 for providing one or more services. At 410, a plurality of packets may be received. A device such as a network device (e.g., the interface component 107, a cable modem termination system (CTMS), an optical line terminal (OLT), a gateway device, etc.) may receive the plurality of packets. The plurality of packets may be associated with data, content, services, and/or the like (e.g., Internet, video, telephony/VOIP, etc.) traversing, within, and/or associated with a network, such as a service provider network and/or the like.

At 420, a value of a class of service (and/or quality of service) parameter may be determined. The class of service parameter may be a class of service parameter of a plurality of class of service parameters. The device may determine the value of the class of service parameter. The device may determine the class of service parameter value based on a filter element. The filter element may be provided by and/or associated with a service provider, a device, a content source, and/or the like. The filter element may be a configuration file, code, encrypted data, and/or the like, and may include information/data associated with one or more factors/rules (e.g., class of service rules, quality of service rules, access control rules, etc.) for managing content. The filter element may be based on a subscription service, account, profile, and/or the associated with a user device (e.g., a modem, a set-top box, a content player, a mobile device, a smart device, a computing device, etc.).

Each packet of the plurality of packets may include (e.g., within a header, etc.) a class of service parameter. The value of a class of service parameter may identify a content source (e.g., the content provider 102, the content server 110, devices, network components, etc.) and/or location from which a packet originates, and/or one or more service providers associated with the packet. Packets may be and/or associated with a particular type, such as a packet associated with Internet, video (e.g., IP video, streaming video, video assets, etc.), and/or the like. The class of service parameter value may be one or more of a Differentiated Services Code Point (DSCP) value, one or more network addresses (e.g., a range of IP addresses, an IPv4 source address range, an IPv6 source address range, an IPv4 destination address range, an IPv6 destination address range, etc.), a range of transmission control protocol (TCP) and/or user datagram protocol (UDP) destination/source ports, and/or the like determined by and/or set by a service provider, a device, and/or the like. The source of the plurality of packets may insert the value into the class of service parameter for each packet of the plurality of packets. The content source may thus be used as a proxy to determine which service a packet is supporting. If the user device is subscribed to the service, then the user device may receive the packet. If the user device is not subscribed to the service, then the user device may not receive the packet.

The device may receive information/instructions from a user device (e.g., a modem, a set-top box, a content player, a mobile device, a smart device, a computing device, etc.) that causes the device to filter and/or segregate packets, such as a plurality of packets that are associated with and/or destined for the user device. The user device may receive and/or be configured with, such as from/by a service provider, configuration information (e.g., a configuration file, an executable program, configuration file, boot file, etc.) associated with a subscribed/selected service. The user device may receive and/or be configured with the configuration information based on a subscription service. Configuration information may include and/or be any element used by a user device to receive a service (e.g., a video service, an IP video service, a streaming video service, a telephony service such as VOIP, a high-speed data (HSD) service such as Internet service, etc.). The configuration information may point, direct, and/or otherwise cause the user device to communicate with a particular device. The configuration information may cause the user device to not communicate with a particular device because the device may not be configured to filter/segregate packets destined for and/or associated with the user device.

The configuration information may indicate that the device is configured to filter/segregate packets destined for and/or associated with the user device according to an authorized value of a class of service parameter included with each packet of a plurality of packets associated with content. The user device may send/provide the authorized value of a class of service parameter to the device prior to and/or during a request for packets (e.g., packets associated with video, packets associated with a content item, packets associated with any selected service, etc.). The authorized value of a class of service parameter may indicate and/or be associated with packets that originate from an authorized device and/or location. Packets may be sent and/or forwarded to the user device by the device according to an authorized value of a class of service parameter. The device may block packets from being sent to the user device that does not include and/or is associated with an authorized value of a class of service parameter.

At 430, one or more packets of the plurality of packets may be sent. The device may send the one or more packets of the plurality of packets to a user device (e.g., a modem, a set-top box, a content player, a mobile device, a smart device, a computing device, etc.). The packets that may be sent comprise one or more packets of the plurality of packets, wherein the value of the class of service parameter for each of the one or more packets of the plurality of packets indicates a content source. The device may use the filter element to determine the class of service parameter value of each packet of the plurality of packets and send the one or more packets of the plurality of packets to the user device based on class of service parameter values indicating an authorized value and/or a content source, such as a content server associated with a particular service provider.

At 440, another one or more packets of the plurality of packets may blocked. The packets that may be blocked comprise another one or more packets of the plurality of packets, wherein the value of the class of service parameter for each of the another one or more packets of the plurality of packets does not indicate the content source. The device may block another one or more packets of the plurality of packets from being sent to the user device (e.g., modem, set-top box, content player, mobile device, smart device, computing device, etc.) based on class of service parameter values not indicating an authorized value and/or a particular content source, such as a content server associated not associated with the particular service provider.

Figure 5:
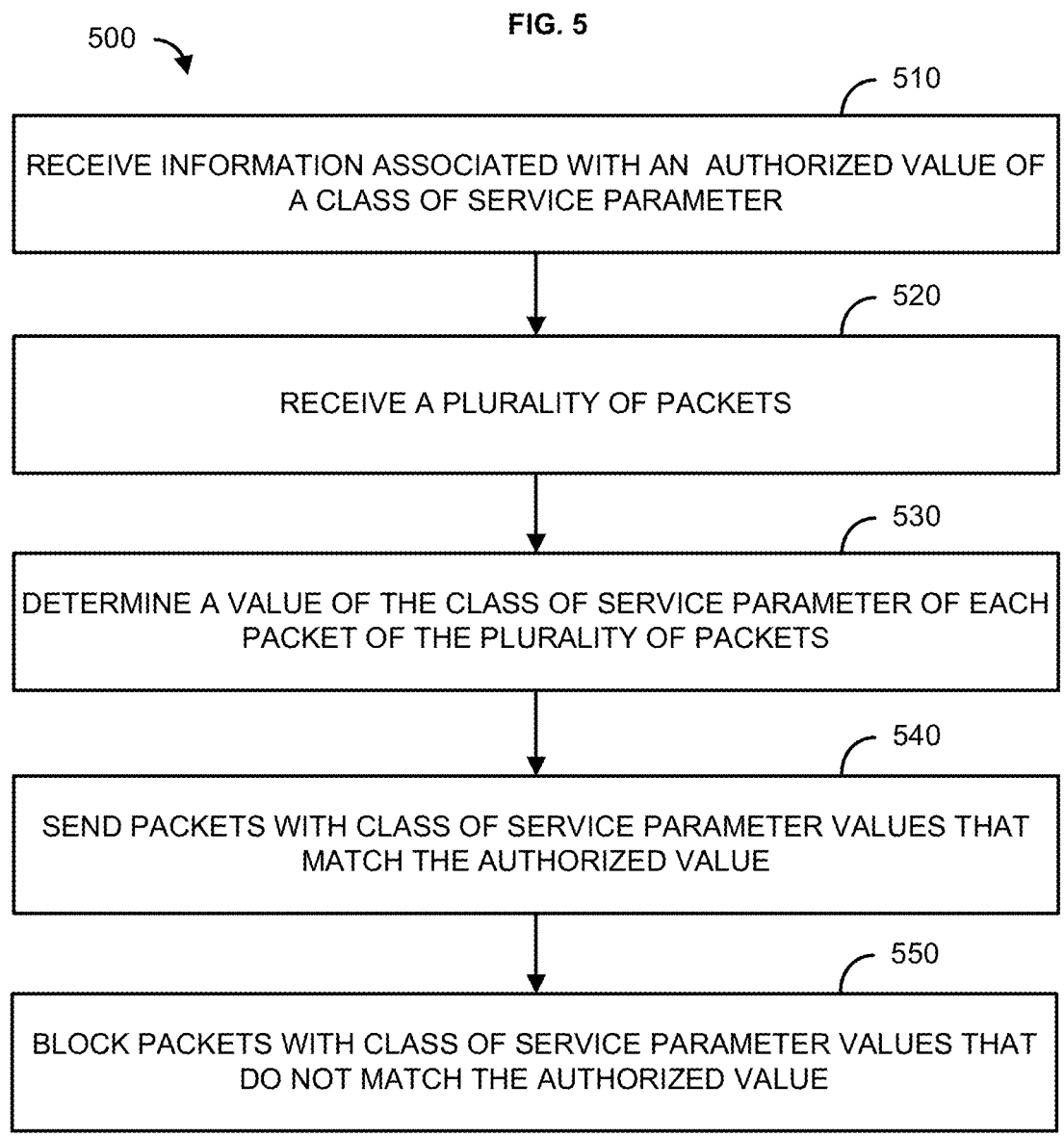
FIG. 5 shows a flowchart of a method for providing one or more services.

FIG. 5 shows a flowchart of an example method 500 for providing one or more services. At 510, information associated with an authorized value of a class of service parameter may be received. A device such as a network device (e.g., the interface 107, a cable modem termination system (CTMS), an optical line terminal (OLT), a gateway device, etc.) may associate an authorized value of a class of service parameter from a user device (e.g., a modem, a set-top box, a content player, a mobile device, a smart device, a computing device, etc.) that causes the device to filter and/or segregate packets, such as a plurality of packets that are associated with and/or destined for the user device.

The user device may receive and/or be configured with, such as from/by a service provider, configuration information (e.g., a configuration file, an executable program, configuration file, boot file, etc.) associated with a subscribed/selected service. The user device may receive and/or be configured with the configuration information based on a subscription service. Configuration information may include and/or be any element used by a user device to receive a service (e.g., a video service, an IP video service, a streaming video service, a telephony service such as VOW, a high-speed data (HSD) service such as Internet service, etc.). The configuration information may point, direct, and/or otherwise cause the user device to communicate with a particular device. The configuration information may cause the user device to not communicate with a particular device because the device may not be configured to filter/segregate packets destined for and/or associated with the user device.

The configuration information may indicate that the device is configured to filter/segregate packets destined for and/or associated with the user device according to an authorized value of a class of service parameter included with each packet of a plurality of packets associated with content. The user device may send/provide the authorized value of a class of service parameter, or send/provide, via the information associated with the authorized value, an instructions (e.g., a pointer, etc.) to use a filter element associated with the authorized value of a class of service parameter, to the device prior to and/or during a request for packets (e.g., packets associated with video, packets associated with a content item, packets associated with any selected service, etc.). The authorized value of a class of service parameter may indicate and/or be associated with packets that originate from an authorized device and/or location.

At 520, a plurality of packets may be received. The device may receive the plurality of packets. The plurality of packets may be associated with data, content, services, and/or the like traversing, within, and/or associated with a network, such as the service provider network and/or the like. The device may receive the packets based on a request from the user device and/or as instructed by the service provider and/or content source.

At 530, a value of a class of service (and/or quality of service) parameter may be determined. The class of service parameter may be a class of service parameter of a plurality of class of service parameters. The device may determine the value of the class of service parameter. The device may determine the class of service parameter value based on a filter element. The filter element may be provided by and/or associated with the service provider, a device, a content source, and/or the like. The filter element may be a configuration file, code, encrypted data, and/or the like, and may include information/data associated with one or more factors/rules (e.g., class of service rules, quality of service rules, access control rules, etc.) for managing content. The filter element may be based on a subscription service, account, profile, and/or the associated with the user device (e.g., modem, set-top box, content player, mobile device, smart device, computing device, etc.). The content source may be used as a proxy to determine which service a packet is supporting. If the user device is subscribed to the service, then the user device may receive the packet. If the user device is not subscribed to the service, then the user device may not receive the packet.

Each packet of the plurality of packets may include (e.g., within a header, etc.) a class of service parameter. The value of a class of service parameter may identify a source (e.g., the content provider 102, the content server 110, devices, network components, etc.) and/or location from which a packet originates, and/or the service provider associated with the packet. Packets may be and/or associated with a particular type, such as Internet packets, video packets (e.g., IP video, streaming video, video assets, etc.), and/or the like. The class of service parameter value may be a Differentiated Services Code Point (DSCP) value, one or more network addresses (e.g., a range of IP addresses, an IPv4 source address range, an IPv6 source address range, an IPv4 destination address range, an IPv6 destination address range, etc.), a range of transmission control protocol (TCP) and/or user datagram protocol (UDP) destination/source ports, and/or the like determined by and/or set by the service provider, a device, and/or the like. The source of the plurality of packets may insert the value into the class of service parameter for each packet of the plurality of packets.

At 540, one or more packets of the plurality of packets may be sent. The device may send the one or more packets of the plurality of packets to the user device (e.g., modem, set-top box, content player, mobile device, smart device, computing device, etc.) when the value of the class of service parameters of the one or more packets matches the authorized value received from the user device. The device may analyze each packet of the plurality of packets to determine the class of service parameter value of each packet and send the one or more packets of the plurality of packets to the user device based on class of service parameter values indicating an authorized value and/or an authorized source, such as a content server associated with the service provider.

At 550, another one or more packets of the plurality of packets may blocked. The device may block another one or more packets of the plurality of packets from being sent to the user device based on class of service parameter values of the another one or more packets not indicating an authorized value and/or a particular source, such as a content server associated not associated with the service provider.

Figure 6:
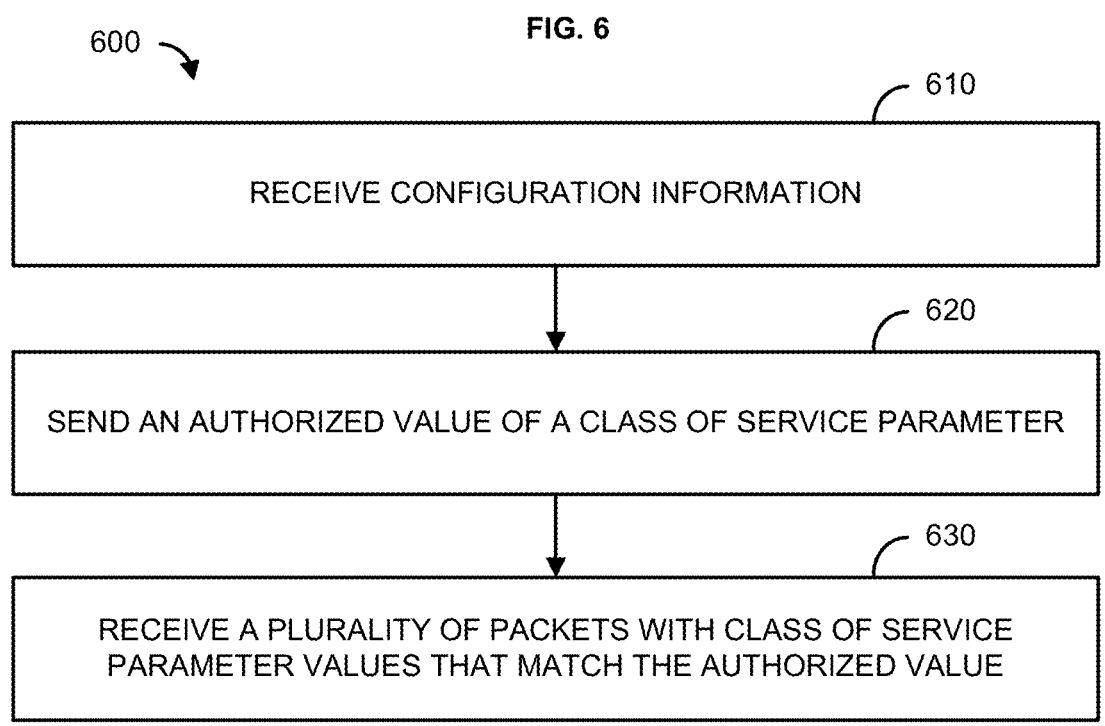
FIG. 6 shows a flowchart of a method for providing one or more services.

FIG. 6 shows a flowchart of an example method 600 for providing one or more services. At 610, configuration information may be received. A user device (e.g., a modem, a set-top box, a content player, a mobile device, a smart device, a computing device, etc.) may receive configuration information. The user device may receive and/or be configured with, such as from/by a service provider, configuration information (e.g., a configuration file, an executable program, configuration file, boot file, etc.) associated with a subscribed/selected service. The user device may receive and/or be configured with the configuration information based on a subscription service. Configuration information may include and/or be any element used by a user device to receive a service (e.g., a video service, an IP video service, a streaming video service, a telephony service such as VOIP, a high-speed data (HSD) service such as Internet service, etc.). The configuration information may point, direct, and/or otherwise cause the user device to communicate with a particular device, such as a network device (e.g., the interface 107, a cable modem termination system (CTMS), an optical line terminal (OLT), a gateway device, etc.). The configuration information may cause the user device to not communicate with a particular device because the device may not be configured to filter/segregate packets destined for and/or associated with the user device.

The configuration information may indicate that the device is configured to filter/segregate packets destined for and/or associated with the user device according to an authorized value of a class of service parameter included with each packet of a plurality of packets associated data, content, services, and/or the like. The class of service parameter may be a class of service parameter of a plurality of class of service parameters. Each packet of the plurality of packets may include (e.g., within a header, etc.) a class of service parameter. The value of a class of service parameter may identify a source (e.g., the content provider 102, the content server 110, devices, network components, etc.) and/or location from which a packet originates, and/or the service provider associated with the packet. Packets may be and/or associated with a particular type, such as Internet-based content, video content (e.g., IP video, streaming video, video assets, etc.), and/or the like. The class of service parameter value may be a one or more of a Differentiated Services Code Point (DSCP) value, one or more network addresses (e.g., a range of IP addresses, an IPv4 source address range, an IPv6 source address range, an IPv4 destination address range, an IPv6 destination address range, etc.), a range of transmission control protocol (TCP) and/or user datagram protocol (UDP) destination/source ports, and/or the like determined by and/or set by the service provider, a device, and/or the like.

At 620, the authorized value of the class of service parameter may be sent to a device, such as a network device. The user device may send/provide the authorized value of a class of service parameter, or send/provide a instructions (e.g., a pointer, etc.) to use a filter element associated with the authorized value of a class of service parameter, to the device prior to and/or during a request for packets (e.g., packets associated with video, packets associated with a content item, packets associated with any selected service, etc.). The authorized value of a class of service parameter may indicate and/or be associated with packets that originate from an authorized device and/or location. Packets may be sent and/or forwarded to the user device according to an authorized value of a class of service parameter. Packets that do not include and/or is associated with an authorized value of a class of service parameter may be blocked from being sent to the user device.

At 630, a plurality of packets may be received. The user device may receive a plurality of packets from the device. The plurality of packets may be sent to the user device when the value of the class of service parameters of the packets matches the authorized value received from the user device. The device may analyze each packet of the plurality of packets to determine the class of service parameter value of each packet and send/forward the one or more packets of the plurality of packets to the user device based on class of service parameter values indicating an authorized value and/or a content source, such as a content server associated with the service provider. The content source may be used as a proxy to determine which service a packet is supporting. If the user device is subscribed to the service, then the user device may receive the packet. If the user device is not subscribed to the service, then the user device may not receive the packet.

The method 600 may further comprise sending, to a content source associated with the authorized value, a request for a second plurality of packets, sending, to a content source not associated with the authorized value, a request for a third plurality of packets, and receiving, via the device, the second plurality of packets. For example, the second plurality of packets may comprise class of service parameters that match the authorized value received from the user device whereas the third plurality of packets may comprise class of service parameters that do not match the authorized value received from the user device. In this fashion, packets that are requested, but are not part of a subscription, may be blocked from being sent to the user device.

The method 600 may further comprise determining, by the device, for each packet of the plurality of packets, the class of service parameter value and sending, to the user device, the plurality of packets, wherein the class of service parameters for the plurality of packets indicate a content source. The method 600 may further comprise determining, by the device, for each packet of an additional plurality of packets, an additional class of service parameter value and blocking the additional plurality of packets, wherein the class of service parameters for the additional plurality of packets do not indicate the content source.

Figure 7:
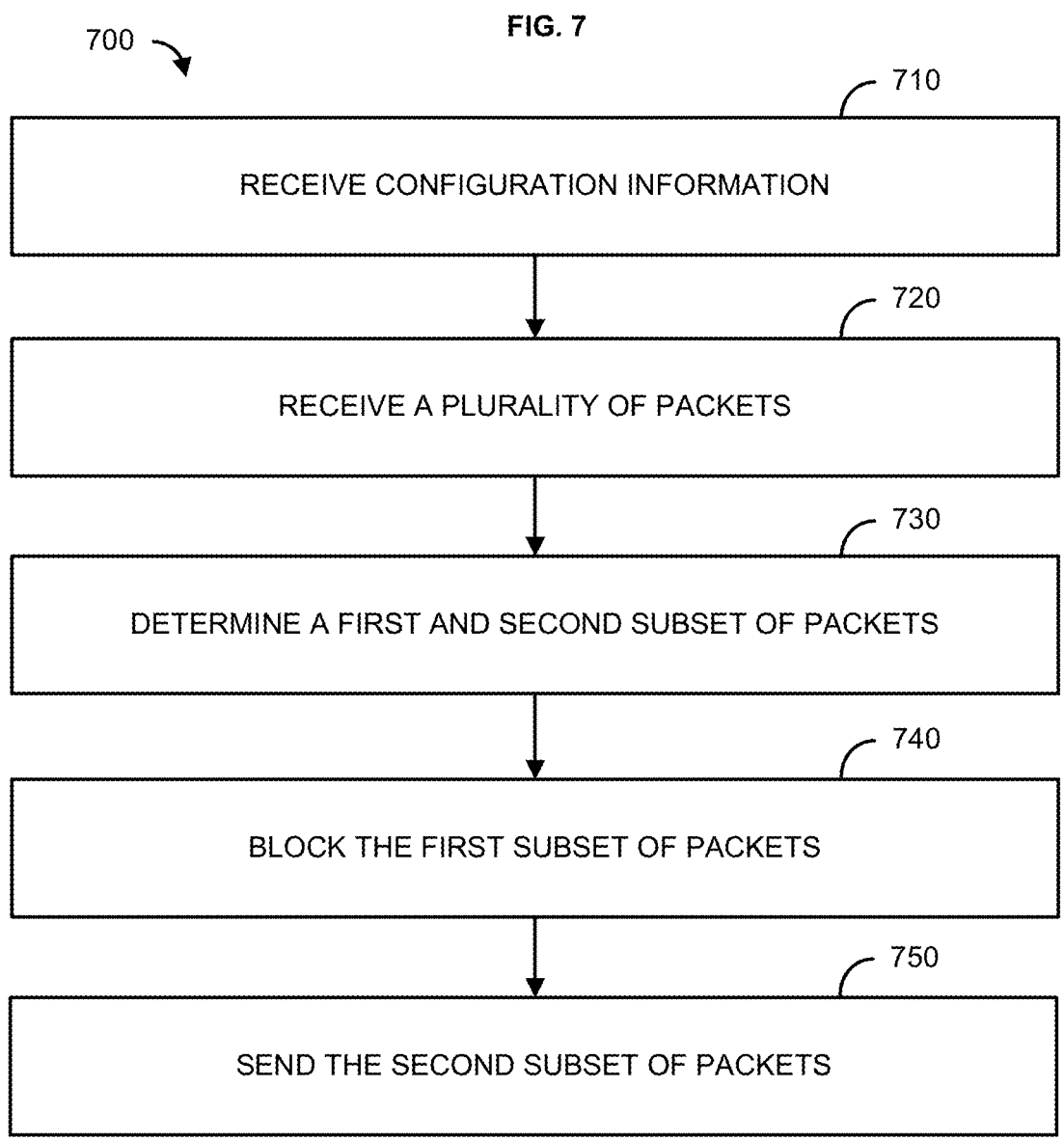
FIG. 7 shows a flowchart of a method for providing one or more services.

FIG. 7 shows a flowchart of an example method 700 for providing one or more services. At 710, a filter element may be received. A device, such as a network device (e.g., the interface 107, a cable modem termination system (CTMS), an optical line terminal (OLT), a gateway device, etc.) may receive the filter element. The filter element may be provided by and/or associated with a service provider, a device, a content source, and/or the like. The filter element may be a configuration file, code, encrypted data, and/or the like, and may include information/data associated with one or more factors/rules (e.g., class of service rules, quality of service rules, access control rules, etc.) for providing a subscribed/selected service. The filter element may be based on a subscription service, account, profile, and/or the associated with a user device (e.g., a modem, a set-top box, a content player, a mobile device, a smart device, a computing device, etc.). The user device may register for and/or subscribe to a service and the device may associate the filter element with the user device. The content source may be used as a proxy to determine which service a packet is supporting. If the user device is subscribed to the service, then the user device may receive the packet. If the user device is not subscribed to the service, then the user device may not receive the packet.

At 720, a plurality of packets associated with one or more content items may be received. The one or more content items may be associated with packets traversing, within, and/or associated with a network, such as a service provider network and/or the like. The device may receive the plurality of packets and each packet of the plurality of packets may include (e.g., within a header, etc.) a class of service parameter (and/or quality of service parameter). The class of service parameter may be a class of service parameter of a plurality of class of service parameters.

At 730, a first and second subset of packets of the plurality of packets may be determined. The device may use the filter element and class of service parameters of each packet of the plurality of packets to determine the first and second subset of packets. The source of the plurality of packets may insert the value into the class of service parameter for each packet of the plurality of packets. The device may use the filter element to filter and/or segregate packets to different subsets, groups, classes, and/or the like. The filter element may dictate that packets of the plurality of packets that are associated with a specific class of service may be associated with the first subset of packets (e.g. Internet, Internet-based content, etc.) and packets of the plurality of packets that are not associated with the specific class of service are associated with the second subset of packets (e.g., video, streaming video, IP video, video assets, etc.). The device may use the filter element to filter and/or segregate packets based on any rule, method, or procedure.

At 740, the first subset of packets may be blocked from being sent to the user device. The device may receive a request for one or more packet of the first subset of packets. The device may determine that a request from the user device includes a request for the one or more packets of the first subset of packets based on a received device identifier and/or content identifier. The request may be for an Internet-based service, such as a website and/or the like associated with the one or more packets of the first subset of packets. The device may block the first subset of packets from being sent to the user device. The user device may be associated with a service, such as a subscription service that only enables certain types of packets (e.g., video, streaming video, IP video, video assets, etc.) to be provided to and/or associated with the user device. The device may block the first subset of packets from being sent to the user device because packets of the first subset of packets may be associated with a type of packets (e.g. Internet, Internet-based content, etc.) that may not be provided to and/or associated with the user device based on the subscription (e.g., a selected service).

At 750, the second subset of packets may be sent to the user device. The device may cause the second subset of packets to be sent to the user device based on request from the user device. The user device may send a device identifier and/or a content identifier to request a content item, such a movie, program, and/or any other type of video. The device may receive the request and use the device identifier to determine that the user device is associated with the subscription service and must therefore only receive packets from the second subset of packets (e.g., video, streaming video, IP video, video assets, etc.), as identified by the class of service parameter. The device may analyze each packet of the second subset of packets and determine, based on the class of service parameters, that at least a portion of the second subset of packets correspond to the requested content item and may be sent to the user device.

Figure 8:
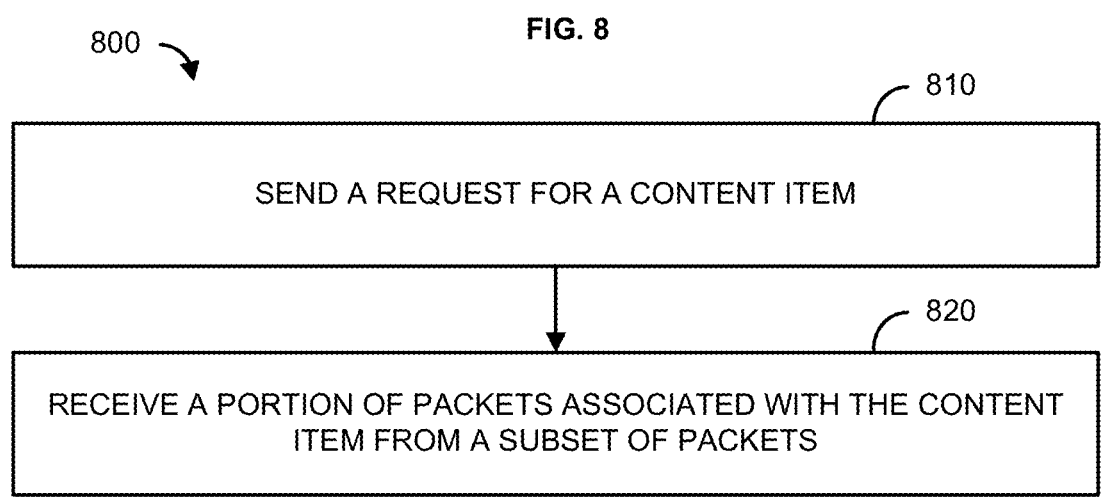
FIG. 8 shows a flowchart of a method for providing one or more services.

FIG. 8 shows a flowchart of an example method 800 for providing one or more services. At 810, a request for content may be sent. A user device (e.g., a modem, a set-top box, a content player, a mobile device, a smart device, a computing device, etc.) may to request one or more content items, such as movies, programs, and/or any other type of video and the request may include a device identifier and one or more content identifiers. A device, such as a network device (e.g., the interface 107, a cable modem termination system (CTMS), an optical line terminal (OLT), a gateway device, etc.) may receive and/or process the request.

The device may use the device identifier to determine that the user device is associated with a subscription service and must therefore only receive a certain type of packets (e.g., video, streaming video, IP video, video assets, etc.). To ensure that the user device only receives the certain type of packets, the device may use a filter element (provided by and/or associated with a service provider, etc.) to filter a plurality of packets associated with data, content, services and/or one or more content items managed by the device. The one or more content items may be associated with packets traversing, within, and/or associated with a network, such as a service provider network and/or the like. The device may receive the plurality of packets and each packet of the plurality of packets may include (e.g., within a header, etc.) a class of service parameter. The class of service parameter may be a class of service parameter of a plurality of class of service parameters. The source of the plurality of packets may insert the value (e.g., authorized value, etc.) into the class of service parameter for each packet of the plurality of packets sent by the source and/or destined for the user device.

The value of a class of service parameter may identify a source, one or more devices (e.g., the content provider 102, the content server 110, network components, etc.), the service provider, and/or one or more other locations from which a packet originates. Packets may be and/or associated with a particular type, such as packets associated with Internet-based content, video content (e.g., video, streaming video, IP video, video assets, etc.), telephony (e.g., VOIP, etc.) and/or the like. The class of service parameter may be one or more of a Differentiated Services Code Point (DSCP) value, one or more network addresses (e.g., a range of IP addresses, an IPv4 source address range, an IPv6 source address range, an IPv4 destination address range, an IPv6 destination address range, etc.), a range of transmission control protocol (TCP) and/or user datagram protocol (UDP) destination/source ports, and/or the like determined by and/or set by the service provider, a device, and/or the like. The source may be used as a proxy to determine which service a packet is supporting. If the user device is subscribed to the service, then the user device may receive the packet. If the user device is not subscribed to the service, then the user device may not receive the packet.

The device may use the filter element and class of service parameters of each packet of the plurality of packets to determine a subset of packets. The device may use the filter element to filter and/or segregate packets to different subsets, groups, classes, and/or the like. The filter element may dictate that packets of the plurality of packets that are associated with a specific class of service may be associated with the subset of packets (e.g., video, streaming video, IP video, video assets, etc.). The device may use the filter element to filter and/or segregate packets based on any rule, method, or procedure. The device may block all other packets of the plurality of packets (e.g., packets not in the subset of packets, etc.) from being sent to the user device.

At 820, at least a portion of the subset of packets may be received. The user device may receive at least a portion of the subset of packets. The portion of the subset of packets may correspond to one or more of the requested content items. The device may analyze each packet of the second subset of packets and determine, based on the class of service parameter values, that at least a portion of the second subset of packets correspond to the one or more requested content items and may be sent to the user device.

Figure 9:
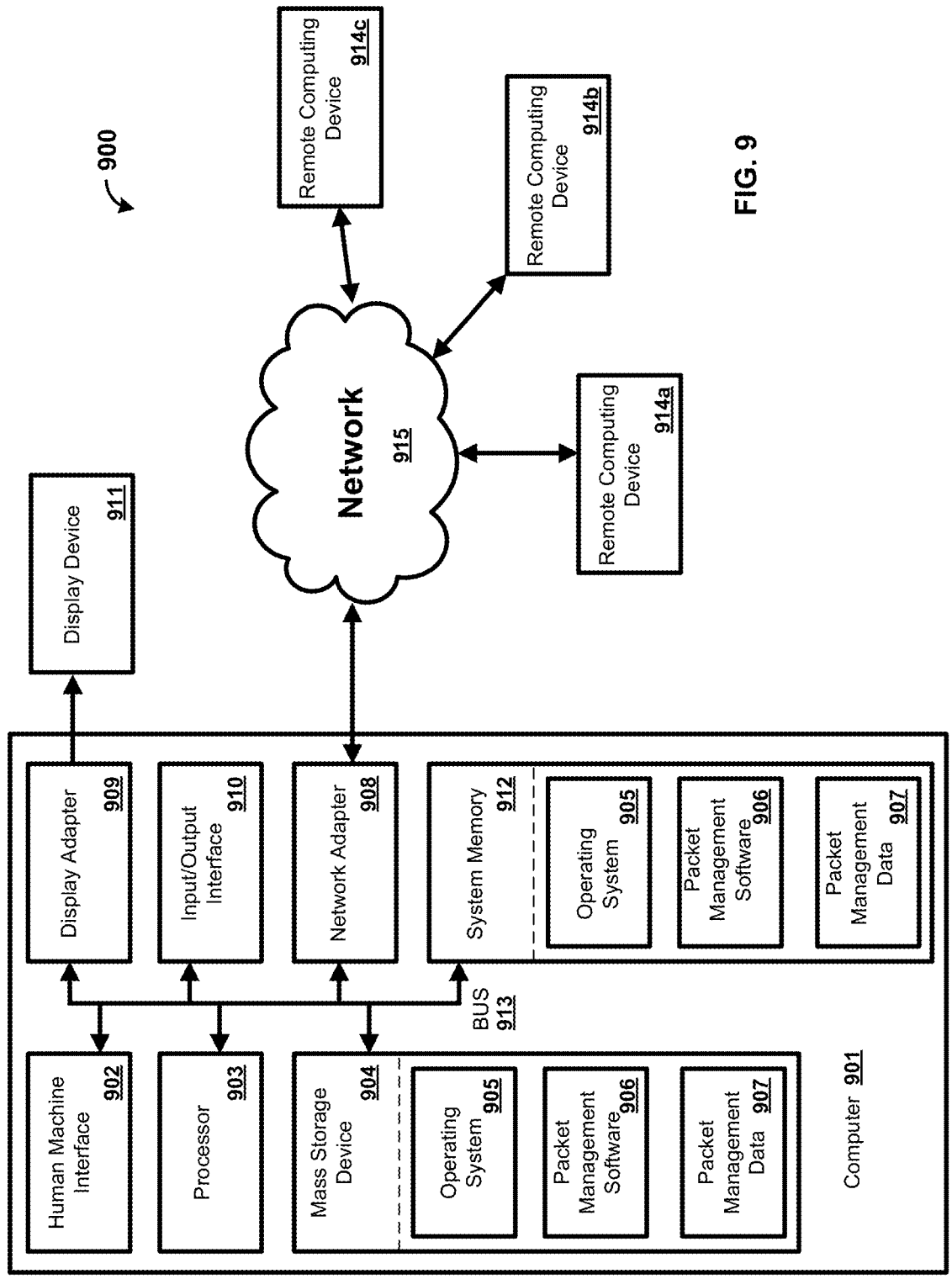
FIG. 9 shows a block diagram of a computing device for implementing or providing one or more services.

FIG. 9 shows an example system 900 for providing content. The edge device 101, the pitcher 104, the interface 107, the configuration server 108, the push notification server 109, the content server 110, the application server 111, the interface 107, the interface 112, the media device 120, the display device 121, the mobile device 124, the user device 201, the network device 209, the network device 210, the source 204, the source 205, the Internet peering router 211, and the display device 212, and/or any other device/component described herein may be a computer 901 as shown in FIG. 9.

The computer 901 may include one or more processors 903, a system memory 912, and a bus 913 that couples various components of the computer 901 including the one or more processors 903 to the system memory 912. In the case of multiple processors 903, the computer 901 may utilize parallel computing.

The bus 913 may comprise one or more of several possible types of bus structures, such as a memory bus, memory controller, a peripheral bus, an accelerated graphics port, and a processor or local bus using any of a variety of bus architectures.

The computer 901 may operate on and/or comprise a variety of computer readable media (e.g., non-transitory). Computer readable media may be any available media that is accessible by the computer 901 and comprises, non-transitory, volatile and/or non-volatile media, removable and non-removable media. The system memory 912 has computer readable media in the form of volatile memory, such as random access memory (RAM), and/or non-volatile memory, such as read only memory (ROM). The system memory 912 may store data such as packet management data 907 and/or program modules such as operating system 905 and packet management software 906 that are accessible to and/or are operated on by the one or more processors 903.

The computer 901 may also comprise other removable/non-removable, volatile/non-volatile computer storage media. The mass storage device 904 may provide non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 904. An operating system 905 and packet management software 906 may be stored on the mass storage device 904. One or more of the operating system 905 and packet management software 906 (or some combination thereof) may comprise program modules and the packet management software 906. Packet management data 907 may also be stored on the mass storage device 904. Packet management data 907 may be stored in any of one or more databases known in the art. The databases may be centralized or distributed across multiple locations within the network 915.

A user may enter commands and information into the computer 901 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

A display device 911 may also be connected to the bus 913 via an interface, such as a display adapter 909. It is contemplated that the computer 901 may have more than one display adapter 909 and the computer 901 may have more than one display device 911. A display device 911 may be a monitor, an LCD (Liquid Crystal Display), light emitting diode (LED) display, television, smart lens, smart glass, and/or a projector. In addition to the display device 911, other output peripheral devices may comprise components such as speakers (not shown) and a printer (not shown) which may be connected to the computer 901 via Input/Output Interface 910. Any step and/or result of the methods may be output (or caused to be output) in any form to an output device. Such output may be any form of visual representation, including, but not limited to, textual, graphical, animation, audio, tactile, and the like. The display 911 and computer 901 may be part of one device, or separate devices.

The computer 901 may operate in a networked environment using logical connections to one or more remote computing devices 914a,b,c. A remote computing device 914a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 901 and a remote computing device 914a,b,c may be made via a network 915, such as a local area network (LAN) and/or a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components may reside at various times in different storage components of the computing device 901, and are executed by the one or more processors 903 of the computer 901. An implementation of packet management software 906 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, by a device, a plurality of packets, wherein each packet of the plurality of packets comprises a class of service parameter of a plurality of class of service parameters;

determining, for each packet of the plurality of packets, a value of the class of service parameter;

sending one or more packets of the plurality of packets, wherein the value of the class of service parameter for each of the one or more packets of the plurality of packets indicates a content source; and blocking another one or more packets of the plurality of packets, wherein the value of the class of service parameter for each of the another one or more packets of the plurality of packets does not indicate the content source.

2. The method of claim 1, wherein the value of the class of service parameter indicates the content source based on the value of the class of service parameter indicating an authorized value, wherein the method further comprises:

receiving, from a user device and based on configuration information, the authorized value, wherein the authorized value is associated with the content source.

3. The method of claim 2, wherein the configuration information comprises a configuration file associated with a subscription service.

4. The method of claim 1, wherein sending the one or more packets of the plurality of packets comprises sending, based on a request from a user device, the one or more packets of the plurality of packets to the user device.

5. The method of claim 1, further comprising:

receiving a request comprising a device identifier associated with a user device; and blocking, based on the device identifier being associated with a subscription service, additional packets of the plurality of packets.

6. The method of claim 1, wherein the one or more packets of the plurality of packets are associated with one or more of video or audio.

7. The method of claim 1, wherein the another one or more packets of the plurality of packets are associated with Internet-based content.

8. The method of claim 1, wherein the class of service parameter comprises one or more of a Differentiated Services Code Point (DSCP) value, one or more port identifiers, or one or more network addresses.

9. An apparatus comprising:
one or more processors; and
memory storing processor-executable instructions that, when executed by the one or more processors, cause the apparatus to:
receive a plurality of packets, wherein each packet of the plurality of packets comprises a class of service parameter of a plurality of class of service parameters;
determine, for each packet of the plurality of packets, a value of the class of service parameter;
send one or more packets of the plurality of packets, wherein the value of the class of service parameter for each of the one or more packets of the plurality of packets indicates a content source; and
block another one or more packets of the plurality of packets, wherein the value of the class of service parameter for each of the another one or more packets of the plurality of packets does not indicate the content source.

10. The apparatus of claim 9, wherein the value of the class of service parameter indicates the content source based on the value of the class of service parameter indicating an authorized value, wherein the processor-executable instructions, when executed by the one or more processors, further cause the apparatus to:

receive, from a user device and based on configuration information, the authorized value, wherein the authorized value is associated with the content source.

11. The apparatus of claim 9, wherein the processor-executable instructions that, when executed by the one or more processors, cause the apparatus to send the one or more packets of the plurality of packets, further cause the apparatus to send, based on a request from a user device, the one or more packets of the plurality of packets to the user device.

12. The apparatus of claim 9, wherein the processor-executable instructions, when executed by the one or more processors, further cause the apparatus to:

receive a request comprising a device identifier associated with a user device; and block, based on the device identifier being associated with a subscription service, additional packets of the plurality of packets.

13. The apparatus of claim 9, wherein the one or more packets of the plurality of packets are associated with one or more of video or audio and wherein the another one or more packets of the plurality of packets are associated with Internet-based content.

14. The apparatus of claim 9, wherein the class of service parameter comprises one or more of a Differentiated Services Code Point (DSCP) value, one or more port identifiers, or one or more network addresses.

15. A system comprising:
a computing device configured to:
receive a plurality of packets, wherein each packet of the plurality of packets comprises a class of service parameter of a plurality of class of service parameters;
determine, for each packet of the plurality of packets, a value of the class of service parameter;
send one or more packets of the plurality of packets, wherein the value of the class of service parameter for each of the one or more packets of the plurality of packets indicates a content source; and
block another one or more packets of the plurality of packets, wherein the value of the class of service parameter for each of the another one or more packets of the plurality of packets does not indicate the content source; and
a user device configured to:
receive the one or more packets of the plurality of packets.

16. The system of claim 15 wherein the value of the class of service parameter indicates the content source based on the value of the class of service parameter indicating an authorized value and wherein the computing device is further configured to:

receive, based on configuration information, the authorized value, wherein the authorized value is associated with the content source.

17. The system of claim 16, wherein the configuration information comprises a configuration file associated with a subscription service.

18. The system of claim 15, wherein the computing device is further configured to:

receive a request comprising a device identifier associated with the user device; and block, based on the device identifier being associated with a subscription service, additional packets of the plurality of packets.

19. The system of claim 15, wherein the one or more packets of the plurality of packets are associated with one or more of video or audio and wherein the another one or more packets of the plurality of packets are associated with Internet-based content.

20. The system of claim 15, wherein the class of service parameter comprises one or more of a Differentiated Services Code Point (DSCP) value, one or more port identifiers, or one or more network addresses.

* * * * *